United States Patent [19]
Okuyama

[11] Patent Number: 5,234,097
[45] Date of Patent: Aug. 10, 1993

[54] TIRE COMPONENT MEMBER CONVEYING APPARATUS

[75] Inventor: Koji Okuyama, Kawagoe, Japan

[73] Assignee: Bridgestone Corporation, Tokyo, Japan

[21] Appl. No.: 835,301

[22] Filed: Feb. 14, 1992

[30] Foreign Application Priority Data

Feb. 14, 1991 [JP] Japan .................................. 3-40771

[51] Int. Cl.⁵ ............................................ B65G 47/26
[52] U.S. Cl. ...................... 198/434; 198/456; 198/689.1; 198/840; 271/240
[58] Field of Search ............ 198/689.1, 811, 834, 198/836.3, 840, 456, 434; 271/240

[56] References Cited

U.S. PATENT DOCUMENTS

| | | | |
|---|---|---|---|
| 3,527,336 | 9/1970 | Johnston | 198/836.3 |
| 3,592,329 | 7/1971 | Fleischauer | 198/689.1 |
| 3,638,564 | 2/1972 | Prange et al. | 271/240 |
| 4,171,044 | 10/1979 | Rossio | 198/834 |

FOREIGN PATENT DOCUMENTS

| | | | |
|---|---|---|---|
| 256417 | 10/1989 | Japan | 198/834 |
| 2-22040 | 1/1990 | Japan . | |

Primary Examiner—Joseph E. Valenza
Attorney, Agent, or Firm—Sughrue, Mion, Zinn, Macpeak & Seas

[57] ABSTRACT

A belt-like tire component member 8 is conveyed to a shaping drum 2 by a belt conveyor 1. There is provided a conveyor belt 6 having a reverse surface with at least one toothed portion 12 which protrudes from the reverse surface at a predetermined position in width thereof and endlessly extends along a longitudinal direction of the belt, a driving drum 4 which drives the conveyor belt 6 and has teeth 14 formed on the outer peripheral portion corresponding to the toothed portion 12 so as to mesh with the toothed portion, and a driving motor 7 which drives the driving drum 4 and controls its rotational speed. There is provided a plurality of air holes 11 on the conveyor belt 6, and an air chamber 9b which is disposed under the conveyor belt 6 so as to contact therewith and to communicate with the air holes 11. Air is supplied to and discharged from the air chamber 9b by a blower 24.

7 Claims, 4 Drawing Sheets

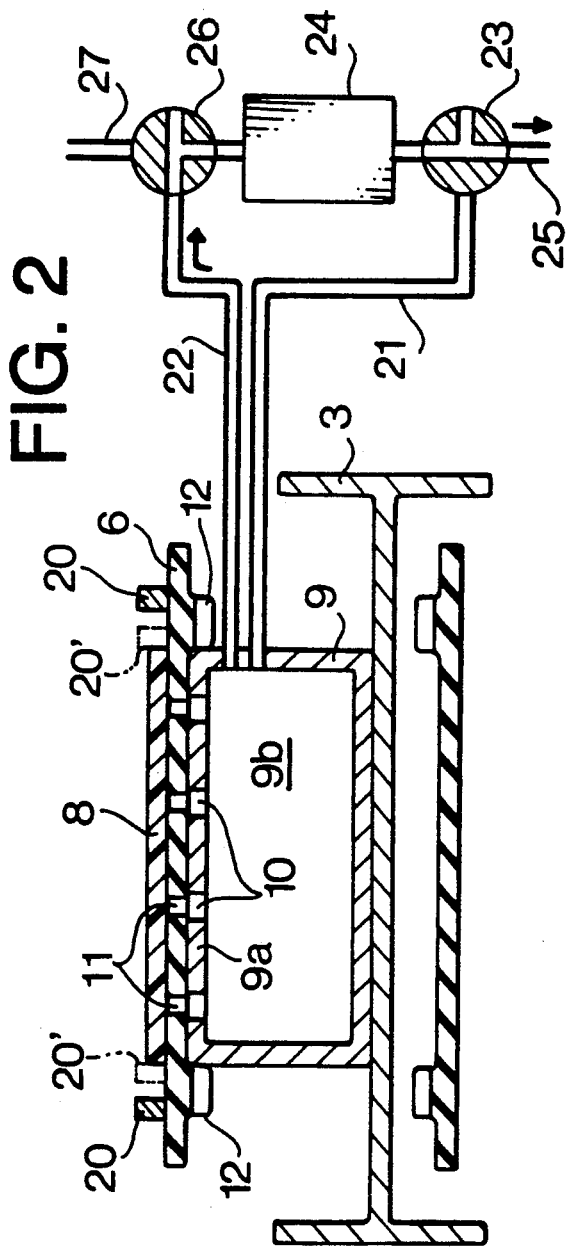
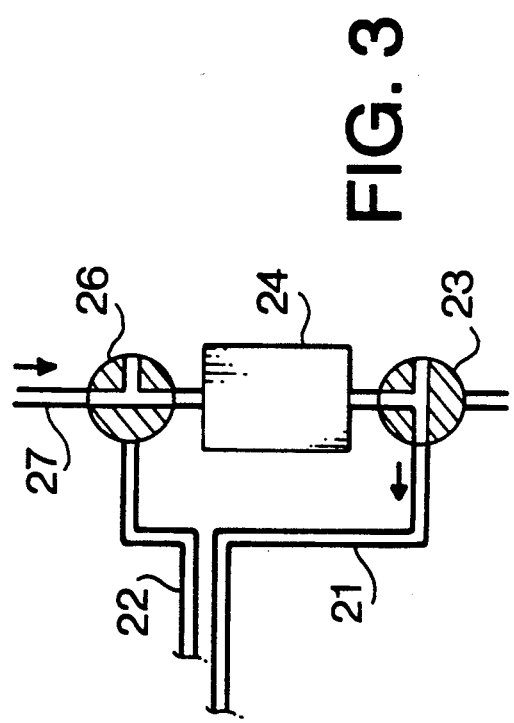

TIRE COMPONENT MEMBER CONVEYING APPARATUS

BACKGROUND OF THE INVENTION

The present invention relates to an apparatus which conveys a belt-like tire component member to a shaping drum in a tire shaping process.

In manufacturing a tire, a rubber belt-like member being cut in a predetermined length as a tire component member is fed toward a shaping drum by a conveyor belt, and subsequently wound at a predetermined outer peripheral portion of the drum to be shaped (For example, refer to the Japanese Laid-Open Patent Publication No. 02-22040 (1990)).

The belt-like member is, first of all, regulated in its widthwise location on the conveyor belt by being sandwiched from both sides by, for example, a pair of guide members which are mutually shiftable in expanding and contracting directions, then subsequently conveyed to the shaping drum by the conveyor belt. In this instance, by driving the shaping drum and the belt conveyor at speeds of constant ratio, the belt-like member is wound around the shaping drum as being appropriately elongated in a longitudinal direction, then the front and rear ends of the belt-like member coincide with each other when finished to be wound.

However, the running speed of the conveyor belt is controlled by controlling a rotational speed of a driving drum (pulley) on which the conveyor belt is wound. Therefore when slippage occurs between the drum and conveyor belt, the belt conveyor no longer runs at a predetermined speed no matter how the rotational speed of the driving drum is accurately controlled to be the predetermined ratio with respect to the rotational speed of the shaping drum. As a result, there is an error in a feeding amount of the belt-like member conveyed together with the conveyor belt. Therefore, the front end and the rear end of the belt-like member on the shaping drum fail to coincide, causing the defect of connecting portion.

Furthermore, when the conveyor belt shifts in a widthwise direction with respect to the driving drum, it will likely result in a zigzag-shaped wound up condition even if the belt-like member is correctly located on the conveyor belt and conveyed to the shaping drum as maintaining its configuration.

On the other hand, when the belt-like member is regulated in its widthwise location on the conveyor belt as explained in the forgoing description, it is desired that the belt-like member easily slides in a widthwise direction on the conveyor belt. When the belt-like member is conveyed, it is desired that the belt-like member does not slide in both the widthwise direction and the longitudinal direction with respect to the conveyor belt.

If the belt-like member does not slide uniformly on the belt along the whole contact surface between the belt-like member and the conveyor belt in the case that the belt-like member is regulated its widthwise location, for example the side edge of the belt-like member is bent by being pushed by the guide member, therefore it is difficult to achieve accurate locating of the belt-like member.

Moreover, if the belt-like member shifts with respect to the conveyor belt in the widthwise direction when conveyed, the feeding position to the shaping drum varies and, consequently, the belt-like member is wound in the zigzag-shape. On the contrary if the belt-like member shifts with respect to the conveyor in the longitudinal direction, amount of the above-described elongation varies and therefore the front end and the rear end fail to coincide when finished to be wound.

SUMMARY OF THE INVENTION

In accordance with the present invention, there is provided a tire component conveying apparatus which conveys a belt-like tire component member to a shaping drum by a belt conveyor, the tire component conveying apparatus comprising a conveyor belt having a reverse surface with at least one toothed portion which protrudes from the reverse surface at a predetermined position in width thereof and endlessly extends along a longitudinal direction of the belt, a driving drum which drives the conveyor belt and has teeth formed on the outer peripheral portion corresponding to the toothed portion so as to mesh with said toothed portion, and a driving control means which drives the driving drum and controls its rotational speed.

In this tire component member conveying apparatus, when the conveyor belt is driven by the driving drum the toothed portion of the conveyor belt and the teeth of the driving drum mesh with each other, therefore, slippage between the conveyor belt and the driving drum during its driving operation is prevented.

Accordingly, if the driving drum is driven and controlled by the driving control means to rotate at a rotational speed ratio of which with respect to the rotational speed of the shaping drum is constant, the conveyor belt runs accurately at the predetermined speed and the tire component member fed by the conveyor belt is wound as expected so that the front end and the rear end coincide when finished to be wound.

Since the toothed portion protrudes from the reverse surface of the conveyor belt, if a guide member which slidably contacts with the side surface of the portion to guide the running direction of the belt is provided on the conveyor frame side, the conveyor belt does not swing in the widthwise direction during its running operation, therefore it can be surely prevented to wind the tire component member up on the shaping drum in a zigzag-configuration.

In accordance with another aspect of the present invention, there is provided a plurality of air holes formed on the conveyor belt, an air chamber disposed under the conveyor belt to communicate with the air holes, and air charging and discharging means for charging air to and discharging it from the air chamber.

With this apparatus, locating the tire component member in the widthwise direction and the conveyor are carried out as follows. Namely, the tire component member is fed on the conveyor belt and, air is supplied in the air chamber so as to blow off through the air holes of the conveyor belt which communicates with the air chamber. Thus, the tire component member is prevented from adhering to the belt conveyor.

In this condition, the tire component member is adjusted its widthwise location by for example one pair of guide bars. Next, air in the air chamber is discharged to cause negative pressure by which the tire component member can be adhere to the conveyor belt. In this situation, the guide bars are removed from the both side ends of the tire component member and, subsequently, the tire component member is conveyed to the shaping drum by driving the conveyor belt.

Accordingly, the tire component member can be surely located at the predetermined position on the conveyor belt in the widthwise direction. After regulated at its location, the tire component member adheres on the conveyor belt and is conveyed to the shaping drum together with the conveyor belt without destructing its configuration and further without causing mutual shifting with respect to the conveyor belt.

Though the toothed portion is endlessly extended along a longitudinal direction of the belt conveyor in at least one portion of the widthwise direction, almost all of the reverse surface of the conveyor belt is formed to be a flat surface. Therefore, this flat surface portion is preferably utilized to provide air holes, and also the air chamber is preferably disposed to abut to this flat surface portion. Moreover, this air chamber can be utilized as the guide member which is in slidably contact with the side surface of the toothed portion.

BRIEF DESCRIPTION OF THE ACCOMPANYING DRAWINGS

FIG. 2 is a cross-section view taken along a line II—II in FIG. 1, showing an air supplying means together with;

FIG. 3 is a view showing an air supplying condition of the air supplying means;

DETAIL DESCRIPTION OF THE PREFERRED EMBODIMENT

Figure 1:
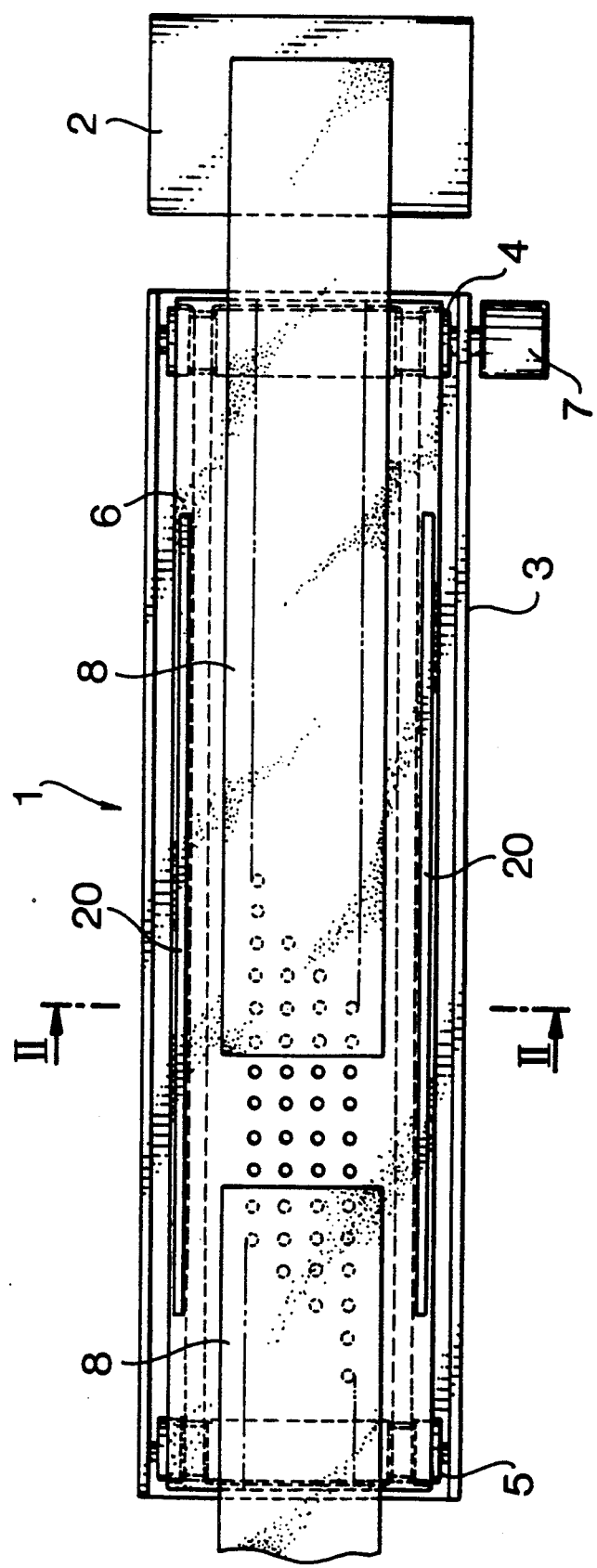
FIG. 1 is a plane view showing an essential portion of the tire component member conveying apparatus of one embodiment in accordance with the present invention.
Figure 4:
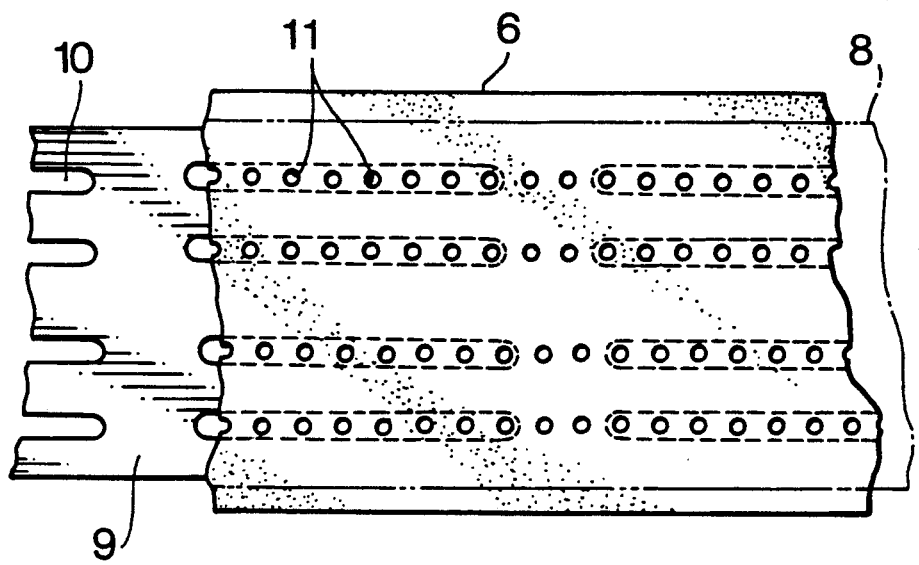
FIG. 4 is a partial plane view showing a conveyor belt and an air chamber.

Referring now to FIGS. 1 and 2, a reference numeral 1 denotes a belt conveyor, and a reference numeral 2 denotes a shaping drum. At front end of a conveyor frame 3 which constitutes a base of the belt conveyor 1, a driving drum (head drum) 4 for the conveyor is supported in a transverse direction, and in a same manner at rear end driven drum (tail drum) 5 is supported in a transverse direction. An endless conveyor belt 6 is installed between the driving drum 4 and the driven drum 5. When the driving drum 4 rotates, in response to this rotation, the conveyor belt 6 is driven so that the upper running portion advances toward the shaping drum 2.

The driving drum 4 is driven by a motor (a driving control means) 7. The motor 7 is a pulse motor or a servo motor which is controlled through an electronic apparatus, and is operated at predetermined timing at predetermined rotational speed to drive the driving drum 4 and also to control its rotational speed.

A belt-like member 8 as a tire component member made of unvulcanized rubber material is fed to the shaping drum 2 by the conveyor belt 6, and subsequently wound and adhered on a peripheral surface of the shaping drum 2 which is rotating. The belt-like member 8 is cut to be slightly shorter than circumferential length of the shaping drum 2. By setting the advancing speed of the conveyor belt 6 to be slightly slower than the circumferential speed of the shaping drum 2, the belt-like member 8 is wound around the shaping drum 6 as being slightly elongated so that the front end and the rear end of the belt-like member 8 coincide when winding is finished.

It is preferable to prepare the belt-like member being cut into a predetermined length beforehand, or it is also preferable to feed the long continuous member on the belt conveyor 1 and in turn cut out the belt-like member 8 from this long continuous member on this belt conveyor 1.

The belt-like member 8 is regulated in its widthwise location on the conveyor belt 6 before it is fed to the shaping drum 2, to be fed to the predetermined widthwise position on the shaping drum 2 by the conveyor belt 6. For this, a pair of guide bars 20, 20 are disposed in parallel with each other to locate along both side edge portions of the conveyor belt 6. These guide bars 20, 20 are provided shiftable in parallel to approach each other or to depart from each other. As is indicated by a reference numeral 20 in FIG. 2, by sandwiching the belt-like member 8 from both sides through the guide bars 20, 20, the belt-like member 8 is adjusted its widthwise location.

When the belt-like member 8 is located in the widthwise direction in the aforementioned manner, it is preferable that the belt-like member 8 is uniformly slidable by using the entire contact surface. However, when the belt-like member 8 is subsequently conveyed by the conveyor belt 6, if the belt-like member 8 shifts in a longitudinal direction with respect to the conveyor belt 6, even if the conveyor belt 6 advance at a predetermined speed, the amount of elongation of the belt-like member 8 varies and, therefore, the front end and the rear end of the belt-like member 8 fails to coincide with each other on the shaping drum 2.

Moreover, if the belt-like member 8 mutually shifts in the widthwise direction with respect to the conveyor belt 6, the winding position on the shaping drum 2 varies and results in the condition where the belt-like member 8 is wound in a zigzag-configuration.

Therefore, it is provided with a means which prevents the conveyor belt 6 and the belt-like member 8 adhering with each other when the belt-like member 8 is adjusted its widthwise location, and to the contrary which adsorbs the belt-like member 8 on the conveyor belt 6 so as not cause slippage therebetween when the belt-like member 8 is conveyed. Specifically, there is provided an air box 9 which contacts with the reverse surface of the upper running portion of the conveyor belt 6 and extends along the belt-like member 8 on the belt.

The inner space of the air box constitutes an air chamber 9b. Also, there are provided a plurality of longitudinal long holes 10 on its upper wall 9a. On the other hand, there are provided a plurality of air holes 11 on the predetermined portion of the conveyor belt 6 which is covered by the belt-like member 8. Thus, the air holes 11 communicate with the air chamber 9b through the long holes 10.

The air chamber 9b is connected with an air supply pipe 21 and an air discharge pipe 22. The air supply pipe 21 is connected to an outlet pipe 25 of a blower 24 through a three-way valve 23. The air discharge pipe 22 is connected valve 26. If the three-way valves 23 and 26 are conditioned as shown in FIG. 3, atmospheric air is supplied into the blower 24 through the inlet pipe 27 and, in turn, air compressed in the blower 24 is charged into the air chamber 9b through the air supply pipe 21. Therefore, the pressure in the air chamber 9b is increased.

Then, since air in the air chamber 9b blows on the upper surface of the conveyor belt 6 through the long holes 10 and the air holes 11, the belt-like member 8 floats on the upper surface of the conveyor belt 6 to prevent the belt-like member adhering to the upper surface of the conveyor belt 6. If the three-way valves 23 and 26 are conditioned as shown in FIG. 2, air in the air chamber 9b is discharged to the blower 24 through the discharge pipe 22 and, further, discharged through the outlet pipe 25.

Therefore, the pressure in the air chamber 9b is reduced to be negative. Then, by using this negative pressure, the belt-like member 8 is sucked on the upper surface of the conveyor belt 6 through the long holes 10 and the air holes 11 to be fixed adhesively.

By providing such means, it can be prevented that the belt-like member 8 mutually shifts with respect to the conveyor belt 6 when conveyed. Accordingly, if the conveyor belt 6 runs at a predetermined speed without swinging in a right-and-left direction, the belt-like member 8 should be correctly wound on the shaping drum 2. However, when slippage occurs between the conveyor belt 6 and the driving drum 4, the advancing speed of the conveyor belt 6 becomes slower than the regular advancing speed determined by the rotational speed of the driving drum 4. As a result, the amount of elongation of the belt-like member 8 increases and, therefore, the front end and the rear end of the belt-like member 8 overlap with each other on the shaping drum 2.

Moreover if the conveyor belt 6 causes slippage on the driving drum 4 in the widewise direction, the advancing direction of the conveyor belt 6 changes in the right-and-left direction, which results in that the belt-like member 8 is wound on the shaping drum 2 in a zigzag-configuration.

Figure 5:
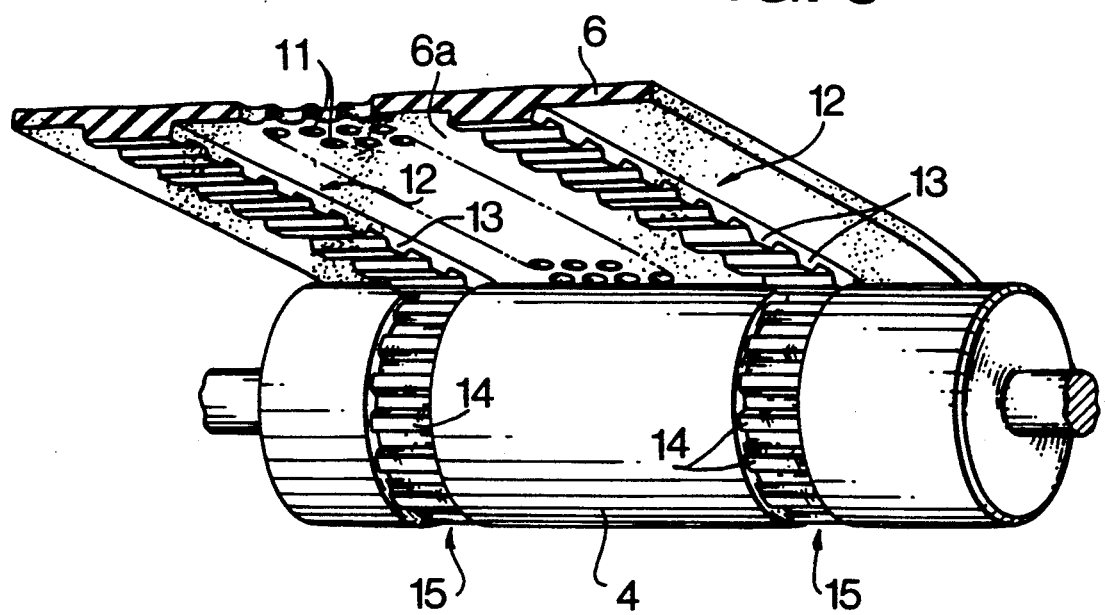
FIG. 5 is a perspective view showing an engaging portion of the conveyor belt and a driving drum.

To prevent this, there is provided one row of a toothed portion 12 extending on the reverse surface of the conveyor belt 6 along each side portion thereof (Refer to FIG. 5). These toothed portions 12 consist of a series of teeth 13 protruding from the reverse side of the conveyor belt 6, and extend endlessly along the longitudinal direction of the conveyor belt 6.

On the other hand, on the outer peripheral surface portion of the driving drum 4 which corresponds to these toothed, portions 12, there are provided toothed portions 15 consisting of a series of teeth 14. The teeth 13 of the conveyor belt 6 and the teeth 14 of the driving drum 4 mesh with each other.

Accordingly, conveyor belt 6 no longer slips with respect to the driving drum 4 and, therefore, runs surely at the predetermined speed. Thus, the front end and the rear end of the belt-like member 8 wound on the shaping drum 2 correctly meet with each other. The toothed portion 15 is formed in such a manner that its teeth 14 do not protrude from the outer peripheral surface of the driving drum 4 as shown in the drawing. Therefore, the conveyor belt 6 is supported by the driving drum 4 in such a manner that the reverse side of the conveyor belt 6 contacts with the driving drum 4 at almost all of the surface.

There is a widely remaining flat reverse surface portion 6a of the conveyor belt 6 between the toothed portions 12 provided at both sides. The air box 9 is provided to contact with this flat reverse surface portion 6a. If the toothed portion 12 is interposed between the upper surface of the air box 9 and the conveyor belt 6, air in the air chamber 9b leaks to the side through a clearance between the teeth 13 of the toothed portion 12. Alternatively outside air is introduced into the air chamber 9b through the clearance of the teeth 13. Consequently, it will become impossible to float or adsorb the belt-like member 8 on the conveyor belt 6 by influencing positive pressure or negative pressure. However, since the air box 9 is provided to contact with the flat reverse portion 6a, it performs its function sufficiently without being disturbed by the toothed portion 12.

Furthermore, the air box 9 is disposed such that its both side surfaces are slidably contacted with the inner side surfaces of the toothed portions 12 as shown in FIG. 2. The air box is fixed on the conveyor frame 3 and elongated in the longitudinal direction of the conveyor belt 6, therefore this air box 9 serves as a guide member which guides the running direction of the conveyor belt 6 through the toothed portion 12. Accordingly, the conveyor belt 6 is surely prevented to swing in the right-and-left direction when it runs. The belt-like member 8 is correctly wound on the shaping drum 2 without causing a zigzag-configuration.

Figure 6:
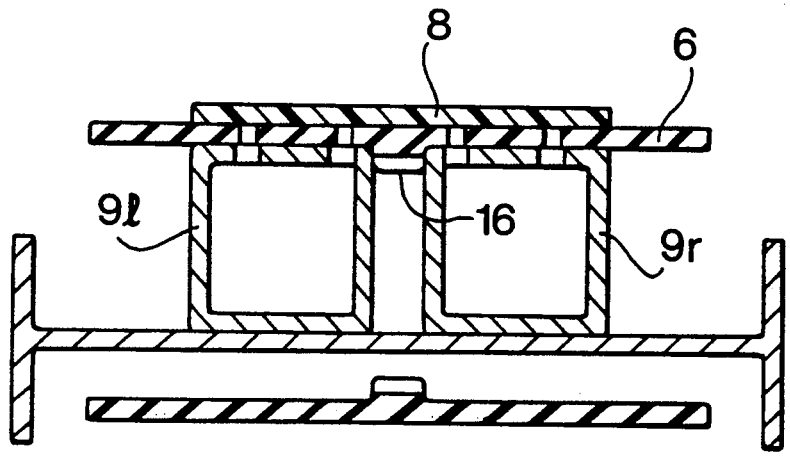
FIG. 6 is a cross-sectional view similar to FIG. 2 but showing another embodiment of the present invention.
Figure 7:
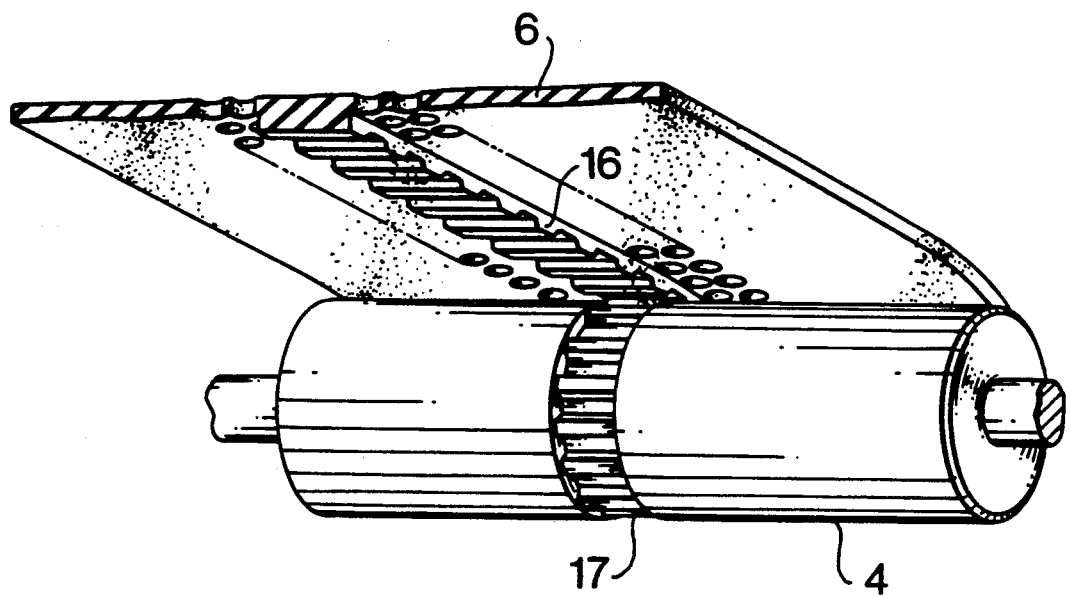
FIG. 7 is a perspective view showing an engaging portion of the conveyor belt and a driving drum in this another embodiment.

FIGS. 6 and 7 show another embodiment of the present invention. In this embodiment, there are formed left and right air chambers 9l and 9r in two rows on the reverse side of the conveyor belt 6 being spaced with each other. And there is provided only one toothed portion 16 at the widthwise center of the conveyor belt 6. On the other hand, there is provided only one toothed portion 17 at the widthwise center of the driving drum 4 to engage with the toothed portion 16. The toothed portion 16 protrudes between the right and left air chambers 9l and 9r to be guided by them.

Though the aforementioned embodiments use the air box as a guide member, it is possible to provide a separate guide member which slidably contacts with the side surface of the toothed portion 12 or the toothed portion 16. Moreover, in the case that the tire component conveying apparatus is provided for conveying a belt-like member including a steel cord, it is possible to use a magnet in place of the air box. In this case, the magnet is disposed at the reverse side of the conveyor belt, and controlled to adsorb the belt-like member by moving the magnet close to the conveyor belt.

What is claimed is:

1. A tire component conveying apparatus which conveys a belt-like tire component member to a shaping drum by a belt conveyor, said tire component conveying apparatus comprising; a conveyor belt having a reverse surface with at least one toothed portion which protrudes from the reverse surface at a predetermined position in width thereof and endlessly extends along a longitudinal direction of the belt, a driving drum which drives said conveyor belt and has teeth formed on the outer peripheral portion corresponding to the toothed portion so as to mesh with said toothed portion, a driving control means which drives the driving drum and controls its rotational speed, locating means for locating said tire component member on said conveyor belt in the widthwise direction, and means for preventing said tire component member from adhering to said conveyor belt when said tire component member is located by said locating means and adhering said tire component member onto said conveyor belt during said tire component member located is conveyed toward said shaping drum.

2. A tire component conveying apparatus in accordance with claim 1 which further comprises a guide member which is disposed to slidably contact with the side surface of the toothed portion of the conveyor belt and to guide a running direction of the conveyor belt.

3. A tire component conveying apparatus in accordance with claim 1 in which the conveyor belt is provided with a plurality of air holes, an air chamber is provided under and contacted with the conveyor belt so as to communicate with the air holes, and air charging and discharging means for charging air to and discharging it from the air chamber is provided.

4. A tire component conveying apparatus in accordance with claim 3 in which side surface of an air box which constitutes the air chamber is disposed to be slidably contacted with side surface of the toothed portion of the conveyor belt.

5. A tire component conveying apparatus in accordance with claim 4 in which there are provided a pair of toothed portions on both sides of the conveyor belt, and the air box is disposed between these toothed portions.

6. A tire component conveying apparatus in accordance with claim 4 in which there is provided the toothed portion at a widthwise center of the conveyor belt, and there are provided a pair of air boxes at opposite sides of the toothed portion.

7. A tire component conveying apparatus in accordance with claim 1 in which the teeth of the driving drum does not protrude from an outer peripheral surface of the driving drum.

* * * * *